UNITED STATES PATENT OFFICE.

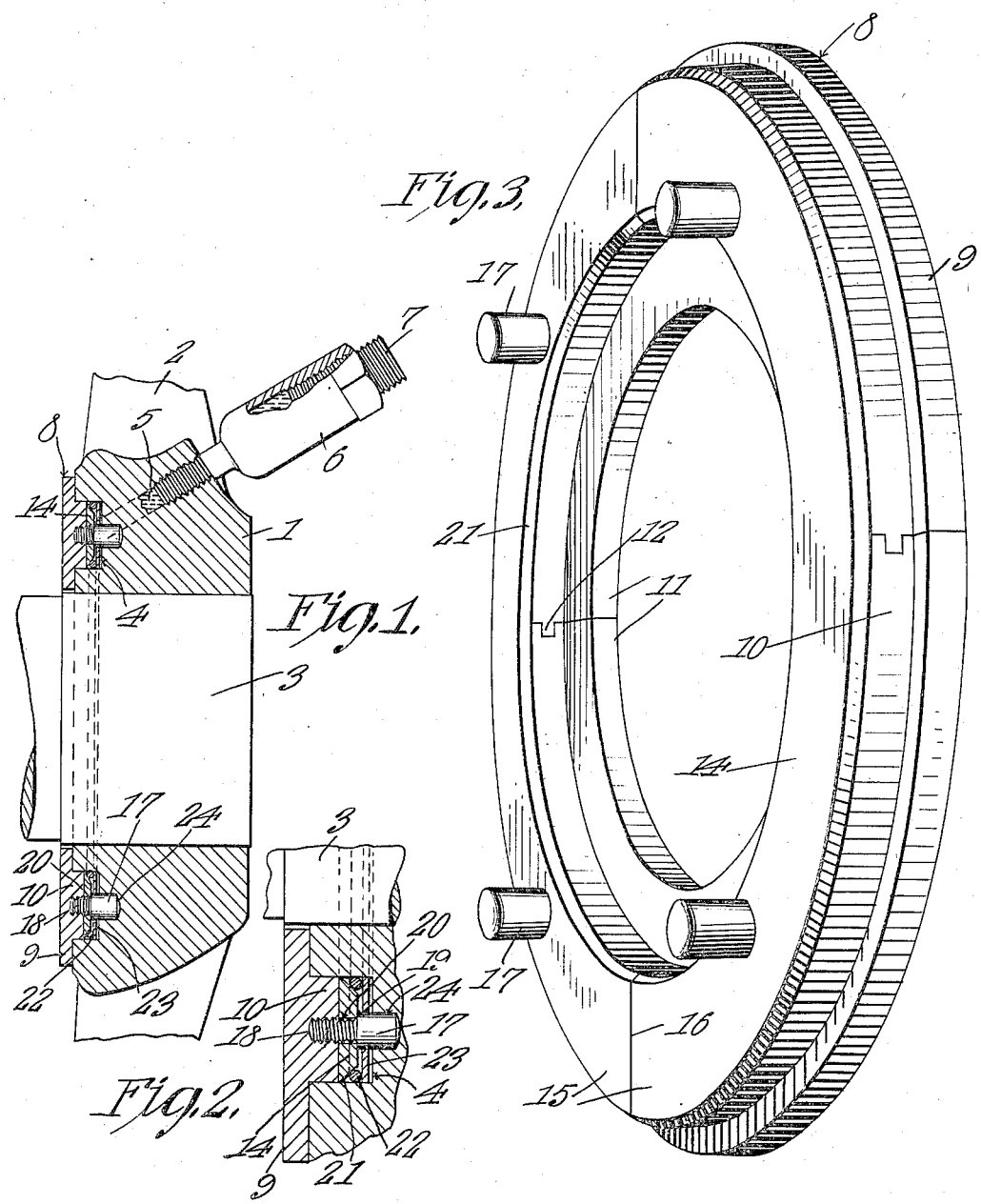

ALBERT J. SAMS, OF PITTSBURG, KANSAS.

HUB-PLATE.

1,226,119.  Specification of Letters Patent.  Patented May 15, 1917.

Application filed April 10, 1916. Serial No. 90,154.

*To all whom it may concern:*

Be it known that I, ALBERT J. SAMS, a citizen of the United States, residing at Pittsburg, in the county of Crawford and State of Kansas, have invented a new and useful Hub-Plate, of which the following is a specification.

The device forming the subject matter of this application is a plate adapted to be assembled with the hub of a wheel of a locomotive engine, after the manner of the showing of Patents 920,094 and 1,058,478.

The invention aims to provide, in a device of the class described, a multi-part hub plate, novel means being provided whereby relative movement may be prevented between the parts of the plate.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is a transverse section showing a portion of the hub of a wheel of a locomotive engine, the plate forming the subject matter of this application being mounted in the hub;

Fig. 2 is a detail enlarged of Fig. 1; and

Fig. 3 is a perspective showing the structure forming the subject matter of this application.

The numeral 1 designates a hub, constituting a part of a wheel 2 of a locomotive engine. Secured to the wheel 2 is an axle 3. In the inner face of the hub 1 is formed a circumscribing groove 4. A duct 5 is fashioned in the hub 1 and communicates with the groove 4. A cup 6 discharges into the duct 5 and is carried by the hub 1. In the cup 6 is mounted a plunger screw 7 or its mechanical equivalent. The numeral 8 designates a hub plate including a flange 9 overlapping the inner face of the hub 1. The hub plate includes an annular rib 10 received in the groove 4. The hub plate preferably is fashioned in a plurality of parts 11, the meeting ends of which may be tongue and grooved together as shown at 12. Applied to the rib 10 of the hub plate 8 is an annular face plate 14 comprising a plurality of parts 15, the meeting ends of which are shown at 16. The ends 16 of the parts 15 of the face plate 14 are disposed in break-joint relation to the abutting ends 12 of the parts 11 of the hub plate 8. The invention comprises a plurality of dowel pins which may be variously constructed. Preferably, however, the dowel pins each include a head 17, and a reduced threaded shank 18 defining a shoulder 19. The shanks 18 of the dowel pins pass through smooth openings 20 formed in the face plate 14. The inner ends of the shanks 18 of the dowel pins are threaded into the hub plate 8 as clearly indicated in Figs. 2 and 1. The shoulders 19 in the dowel pins bear against the rear face of the face plate 14 and thus the plate 14 is held on the rib 10 of the hub plate 8. A simple but efficient means thus is provided whereby the face plate 14 is held to the plate 8 and it is possible, if desired, to fashion the plates 8 and 14 out of different sorts of metal. The heads 17 of the dowel pins pass through a ring 23 located in the groove 4. The ring 23 preferably is a thin metal plate. If desired, the inner and outer edges of the face plate 14 may be beveled as shown at 21, and packings 22, which may be wire rings, may be interposed between the beveled edges 21 of the plate 14 and the ring 23. As in my prior patent above mentioned, a liquid in the cup 6 may be advanced by the plunger 7 through the duct 5 into the groove 4, thus crowding the hub plate rearwardly and causing the hub plate to coact with the bearing (not shown) wherein the axle 3 is journaled. The liquid in the cup 6 may be a lubricant and a somewhat stiff grease may be used. The function of the ring 23 and the packings 22, when the same are used, is to prevent a leakage of the lubricant out of the groove 4.

The device forming the subject matter of this application affords a simple but efficient means whereby a multi-part hub plate of the type above described may be efficiently made, and whereby the parts of the said plate may be prevented from having relative movement.

The heads 17 of the pins, as will be readily understood, are received in recesses 24 fashioned in the hub 1 at the base of the groove 4, independent rotation between the hub plate 8 and the hub 1 thus being prevented.

Having thus described the invention, what is claimed is:—

1. In a device of the class described, a hub plate comprising separable parts; a relatively stiff reinforcing face plate applied to the hub plate and comprising separable parts, the ends of the parts of the hub plate and the ends of the parts of the face plate being disposed in break-joint relation; pins forming connections between the parts of the face plate and the parts of the hub plate; and a hub including a groove wherein the hub plate and the face plate are received, there being recesses in the hub, at the base of the groove and receiving the pins.

2. In a device of the class described, a hub plate comprising parts; a face plate applied to the hub plate and comprising parts, the ends of the parts of the hub plate and the ends of the parts of the face plate being disposed in break-joint order; screws including heads and threaded shanks defining shoulders, the shoulders engaging the face plate and the shanks passing through the face plate and engaging the hub plate; and a hub including a groove wherein the face plate and the hub plate are received, there being recesses in the hub at the base of the groove, and receiving the heads of the screws.

In testimony that I claim the foregoing as my own, I have hereto affixed my signature in the presence of two witnesses.

ALBERT J. SAMS.

Witnesses:
  MABEL E. LANE,
  M. DRUMMOND.